UNITED STATES PATENT OFFICE.

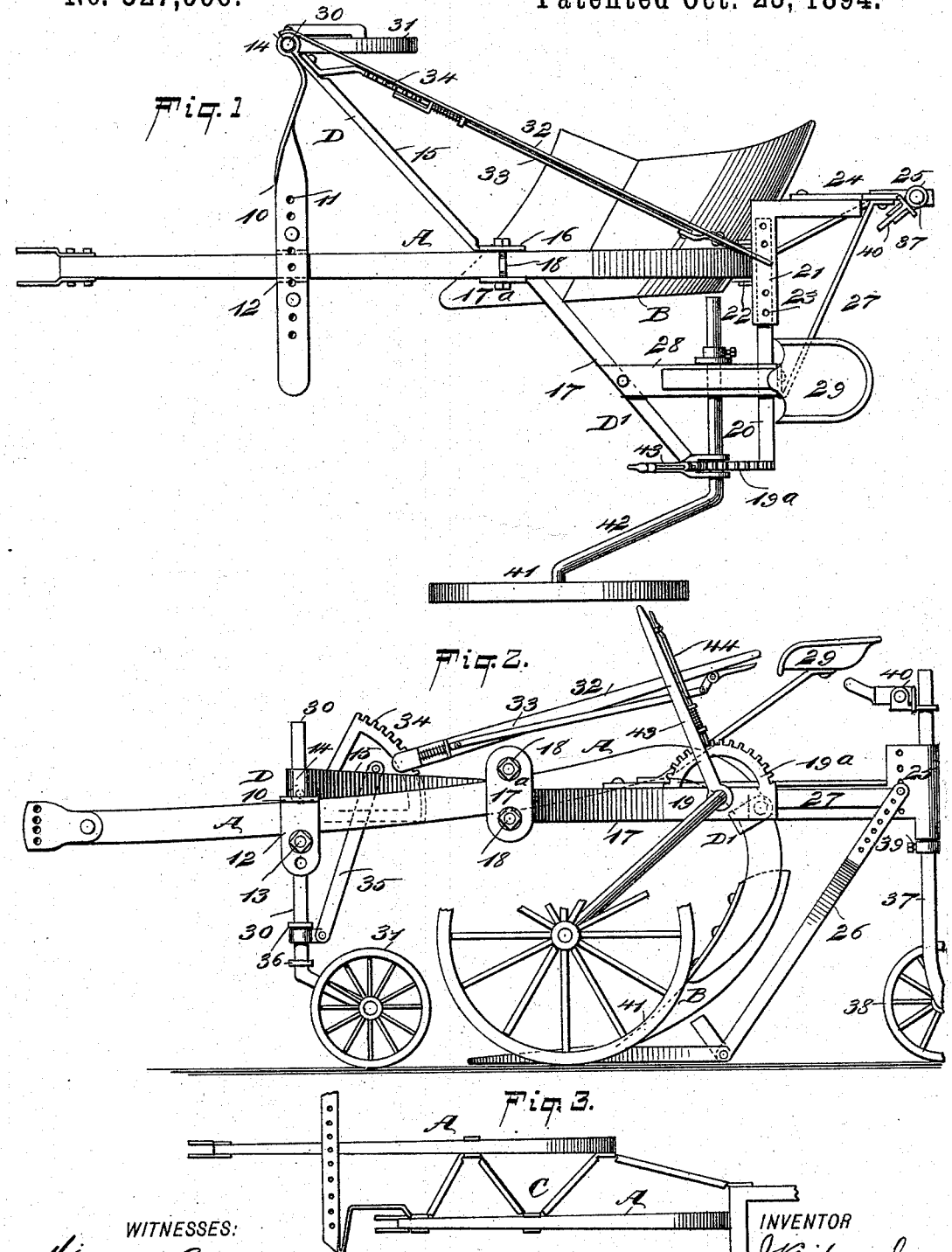

JAMES KLEIHAUER, JR., OF JOHNSON, NEBRASKA, ASSIGNOR TO HIMSELF AND CHARLES E. CURRAN, OF SAME PLACE.

RIDING ATTACHMENT FOR PLOWS.

SPECIFICATION forming part of Letters Patent No. 527,996, dated October 23, 1894.

Application filed March 19, 1894. Serial No. 504,217. (No model.)

*To all whom it may concern:*

Be it known that I, JAMES KLEIHAUER, Jr., of Johnson, in the county of Nemaha and State of Nebraska, have invented a new and Improved Riding Attachment for Plows, of which the following is a full, clear, and exact description.

My invention relates to a riding attachment for walking plows, and it has for its object to provide an attachment of the above named character, capable of convenient and expeditious application and adjustment to the beam of any kind of walking plow; and a further object of the invention is to construct the attachment in an exceedingly simple, durable and economic manner.

The invention consists in the novel construction and combination of the several parts, as will be hereinafter fully set forth, and pointed out in the claim.

Reference is to be had to the accompanying drawings forming a part of this specification, in which similar figures and letters of reference indicate corresponding parts in all the views.

Figure 1 is a plan view of the plow. Fig. 2 is a side elevation; and Fig. 3 is a view illustrating plow beams arranged in a gang.

In carrying out the invention the beam A is the usual plow beam, and the share B such as is usually attached to the beam.

The attachment is constructed in the following manner: A forward cross bar 10 provided with a series of apertures 11 is carried across the plow beam a predetermined distance from its forward end, and clips 12, are secured to the bar 10 through the medium of the apertures 11, in such manner that the said clips will be located one at each side of the beam; and the clips are tied to the beam by a tie bolt 13, as shown in Fig. 2. In this manner the bar 10 may be made to fit any beam, and the said bar where it crosses the beam is flat, but at its right hand end it is twisted so as to stand vertically, and is provided with a socket 14, formed at its right hand extremity, and from said socket a branch 15 is projected rearward and inward to the beam A, said branch at its inner end being provided with a clip 16, adapted for engagement with the right-hand side of the plow.

Diagonally opposite the bar 15, at the left-hand side of the plow a corresponding bar 17 is located, and this bar is provided with a clip 17ª engaging with the left-hand side of the plow beam and facing the clip 16, the two clips being connected by bolts 18. The bar 17, is carried rearward and outward, and is provided with a straight or rearwardly extending section 19, having formed thereon a rack 19ª; and the rear extension 19, is provided with a further extension 20, located at right angles to the section 19, the section or extension 20 being carried in direction of the left-hand side of the plow beam ovər the rear portion thereof.

The section or bar 20 is made to connect with an angular or L-shaped bar 21 in an adjustable manner, the said section 20 being preferably L-shaped or angular in cross section also; and the adjustable connection is effected by passing suitable bolts through openings 23 in the angular bar 21, and in the rear bar or section 20. The rearwardly extending member of the bar 21 has adjustably connected therewith an extreme rear bar 24, which terminates at its rear end in a socket 25, and the said socket has adjustably connected with it a brace rod 26, which is carried down to the land side of the plow in order to support the same, while a brace 27 is made to connect the extreme rear bar 24 with the left-hand rear bar 20, strengthening the rear end of the attachment, since this portion sustains the greatest weight.

A cross bar 28 extends from the diagonal left-hand bar 17 of the attachment to the rear left-hand bar 20, and this cross bar acts as a table to support a seat 29. In the socket 14 at the front right-hand end of the attachment the shank 30 of a wheel 31 is mounted, the said shank being capable of vertical movement, and a lever 32, provided with a thumb latch 33, is pivoted at its forward end upon the socket 14, the thumb latch of the said lever being made to engage with a rack 34 located upon the forward right hand diagonal bar 15; and the lever is connected with the lower portion of the wheel shank 30 through the medium of a link 35, as shown in Fig. 2, the said link terminating in a collar which is located upon the shank of the wheel between stops 36, formed upon the latter. Thus by manipulating the lever 32 the wheel 31 may be raised and lowered. This wheel is the outer furrow wheel, being adapted to travel in the furrow previously made, and by the adjustment of this wheel the depth that the plow shall travel is regulated. The shank 37 of a second and inner furrow wheel 38 is mounted to turn in the rear socket 25 of the attachment, the said shank being provided with a collar 39, as shown in Fig. 2, adjustably located in order that the position of the wheel may be changed. This inner furrow wheel travels in the furrow being made, and is used to guide the plow, being turned to the right or to the left through the medium of a lever 40.

A land side wheel 41, located at the left-hand side of the plow beam, is mounted upon an angular axle 42, which axle is journaled in the extreme left-hand section of the attachment, and likewise in bearings formed in the table or cross bar 28. The crank or angular axle 42, is manipulated to raise or lower the wheel 41 by means of a lever 43 having a thumb latch 44 which engages with the rack 19ª, and is operated from the driver's seat.

It is evident that this attachment may be made to any character of walking plow in a convenient and expeditious manner, converting it into a riding plow; and that when the plow is to be used again as a walking plow the attachment may be readily removed.

A third connection is usually made between the plow beam and the frame, which is accomplished at the rear of the plow beam through the medium of clips 22, secured to the right-hand rear section 21 of the attachment. In Fig. 3 I have illustrated a serpentine connecting bar C, through the medium of which two plow beams may be connected, in order that a gang riding plow may be made from two or more ordinary walking plows.

It may here be remarked that the attachment virtually comprises two frames, a forward and right-hand frame D, embracing the bar 10 and attached parts, and a left-hand rear frame D', embracing the bars 17, 19, 20, 21 and 24, both frames being of angular construction.

Having thus described my invention, I claim as new and desire to secure by Letters Patent—

The combination, with the beam of a walking plow, of a riding attachment, the same consisting of a right-hand angular frame attached to the right-hand side of the beam, extending across the forward portion thereof and adjustably connected with said forward portion, a furrow wheel adjustably journaled in such right-hand frame, a lift lever carried by said frame and connected with said furrow wheel, a second frame of angular construction attached to the left-hand side of the beam and extending across the rear of the beam to the opposite side, a second furrow wheel mounted to turn at the rear end of the said left-hand frame, a seat mounted upon the left-hand frame at the left hand side of the plow beam, an angular axle journaled in the left-hand side of the left hand frame, carrying a land side wheel, and a lever whereby the said axle is manipulated, as and for the purpose specified.

JAMES KLEIHAUER, JR.

Witnesses:
G. S. CHRISTY,
W. S. FISK.